(12) United States Patent
Takatori et al.

(10) Patent No.: US 9,928,575 B2
(45) Date of Patent: Mar. 27, 2018

(54) METHOD AND SYSTEM FOR PROCESSING A MULTI-CHANNEL IMAGE

(71) Applicant: SONY CORPORATION, Tokyo (JP)

(72) Inventors: Jiro Takatori, Tokyo (JP); Tak Shing Wong, Fremont, CA (US); Xiaogang Dong, Boyds, MD (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/057,945

(22) Filed: Mar. 1, 2016

(65) Prior Publication Data
US 2017/0256035 A1    Sep. 7, 2017

(51) Int. Cl.
| | |
|---|---|
| G06K 9/00 | (2006.01) |
| G06T 5/00 | (2006.01) |
| G06K 9/62 | (2006.01) |
| G06K 9/52 | (2006.01) |
| G06T 7/00 | (2017.01) |
| G06K 9/46 | (2006.01) |
| G06T 7/40 | (2017.01) |

(52) U.S. Cl.
CPC .............. *G06T 5/00* (2013.01); *G06K 9/4604* (2013.01); *G06K 9/4652* (2013.01); *G06K 9/52* (2013.01); *G06K 9/6215* (2013.01); *G06T 7/0085* (2013.01); *G06T 7/408* (2013.01); *G06T 2207/20021* (2013.01)

(58) Field of Classification Search
USPC ....... 382/167, 199, 274, 275, 260, 266, 276, 382/162, 264; 345/207, 589, 590; 348/275, 276, 279, E5.081; 358/3.08, 358/447; 375/240.29
See application file for complete search history.

(56) References Cited

U.S. PATENT DOCUMENTS

| | | | | |
|---|---|---|---|---|
| 5,506,699 | A * | 4/1996 | Wong | H04N 1/40075 358/3.08 |
| 8,446,965 | B2 * | 5/2013 | Tanaka | H04N 19/176 375/240.29 |
| 8,692,906 | B2 | 4/2014 | Kiyosawa et al. | |
| 8,922,683 | B2 * | 12/2014 | Hayashi | H01L 27/14621 348/275 |
| 9,159,758 | B2 * | 10/2015 | Tanaka | H04N 9/045 |
| 9,184,196 | B2 * | 11/2015 | Tanaka | H04N 9/045 |

(Continued)

OTHER PUBLICATIONS

Hani Muammar, et al., "An investigation into aliasing in images recaptured from an LCD Montor Using a Digital Camera", Electrical and Electronic Engineering Department, Imperial College London, United Kingdom, May 2015, pp. 5.

*Primary Examiner* — Anh H Do
(74) *Attorney, Agent, or Firm* — Chip Law Group

(57) ABSTRACT

A method for processing a multi-channel image includes modification of adjusted pixel values of one or more pixels in a region of the multi-channel image, in accordance with a pre-specified signal pattern based on one or more parameters. A score is determined based on a ratio of a pixel difference value and a maximum pixel step value. The maximum pixel step value corresponds to modified pixel values of the one or more pixels in the region when the maximum pixel step value exceeds a threshold noise level for the region. False color is suppressed in a selected region of the multi-channel image based on the determined score when the false color is identified in the region.

24 Claims, 6 Drawing Sheets

(56) References Cited

U.S. PATENT DOCUMENTS

| | | | |
|---|---|---|---|
| 9,324,749 B2 * | 4/2016 | Hayashi | ............... H04N 9/045 |
| 2005/0259165 A1 | 11/2005 | Jaspers | |
| 2014/0037207 A1 | 2/2014 | Chen | |

\* cited by examiner

METHOD AND SYSTEM FOR PROCESSING A MULTI-CHANNEL IMAGE

REFERENCE

None.

FIELD

Various embodiments of the disclosure relate to processing a multi-channel image. More specifically, various embodiments of the disclosure relate to processing a multi-channel image for suppression of aliased colors.

BACKGROUND

The integration of camera systems into devices has created a large variety of systems of different shapes, sizes, and functionalities. These devices, for example, include smart phones, surveillance cameras, wearable cameras, camcorders, digital single-lens reflex cameras, mirror-less cameras, and tablets. The integration of the camera systems may require a tradeoff in image quality, device size, and/or costs. Usually, a desire for improved image quality remains same although the systems and image/video capturing platforms may change. For example, digital images and video frames may have certain issues with image quality related to sharpness, noise, distortions, artifacts, and/or chromatic aberration.

In image processing and photography, aliasing is an effect that causes different signals to become indistinguishable or aliases of one another when sampled. A digital image sampling system may suffer from aliasing when the input signal's frequency is higher than the Nyquist frequency of the system. For a digital image, distortions and artifacts may result, when the digital image may be reconstructed from samples different from the original scene. For multi-channel images, such as digital color images, reconstructed by colored image sampling systems, colors that may be different from those in the actual scenes may appear in some regions of reconstructed color images due to aliasing. Such false colors may be more noticeable to a human visual system, and usually referred to as "color aliasing".

Typically, a multi-channel image is obtained via a single image sensor overlaid with a spatial color filter array (CFA), which is a mosaic of tiny color filters placed over each pixel. The most famous CFA pattern is the Bayer pattern that involves red, green, and blue filters. Imaging sensors equipped with the Bayer CFA pattern are often called Bayer sensors. Imaging sensors equipped with a CFA tend to suffer from color aliasing from processing. In order to suppress color aliasing, filters such as optical anti-aliasing filters are generally applied in front of a color-imaging sensor. However, these filters result in a tradeoff in picture quality as the filters reduce the overall sharpness of a captured image.

In order to increase the sharpness of captured images and reduce production cost, more and more image sensors are manufactured without optical anti-aliasing filters. Thus, a need still remains for an image processing system that can deliver sharpness in picture quality while still removing and suppressing the disadvantages of color aliasing. In view of the increasing demand for providing higher resolution images and videos, it is increasingly critical that answers or solutions need be found to these problems.

The aliased colors in the one or more regions of the multi-channel image may be present in different patterns, such as a circular pattern, corner circular pattern, and/or moiré pattern, based on a change in pixel values in a color-aliased region. Thus, there is a need for an efficient and a robust anti-aliasing technique and/or system that may suppress the aliased colors, which are in specific signal patterns, in one or more color-aliased regions in the multi-channel image.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system to process a multi-channel image are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
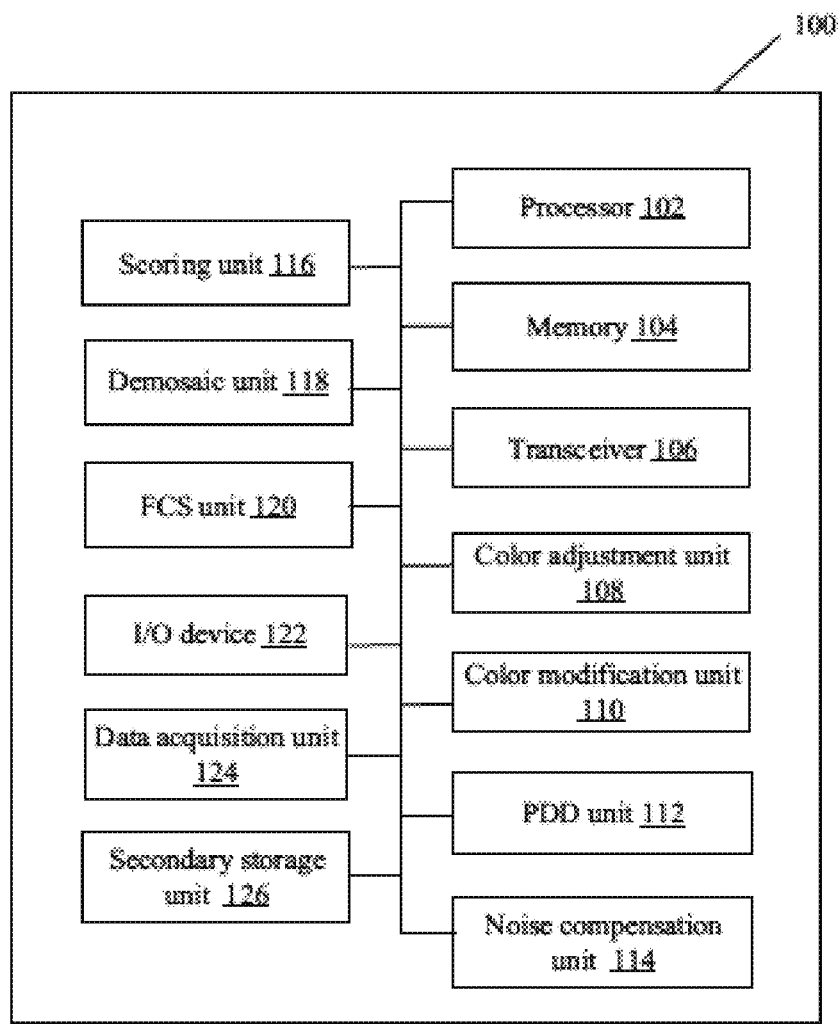
FIG. 1 is a block diagram that illustrates various components of an image-processing device utilized to process a multi-channel image, in accordance with an embodiment of the disclosure.

Various implementations may be found in a method and/or a system to process a multi-channel image. The following embodiments are described in sufficient detail to enable those skilled in the art to make and use the disclosed embodiments. While the present disclosure has been described with reference to certain embodiments, it will be understood by those skilled in the art that various changes may be made and equivalents may be substituted without departing from the scope of the present disclosure In the following description, numerous specific details are given to provide a thorough understanding of the disclosure. However, it may be apparent that the disclosed embodiments may be practiced without these specific details. In order to avoid obscuring the present disclosure, some well-known definitions, circuits, system configurations, and process steps are not disclosed in detail.

The drawings showing embodiments of the system are semi-diagrammatic and not to scale and, particularly, some of the dimensions are for the clarity of presentation and are shown exaggerated in the drawings. Where multiple embodiments are disclosed and described having some features in common, for clarity and ease of illustration, description, and comprehension thereof, similar and like features one to another will ordinarily be described with similar reference numerals.

FIG. 1 is a block diagram that illustrates various components of an image-processing device utilized to process a multi-channel image, in accordance with an embodiment of the disclosure. With reference to FIG. 1, there is shown an image-processing device 100. The image-processing device 100 may comprise one or more processors, such as a processor 102, a memory 104, a transceiver 106, a color adjustment unit 108, a color modification unit 110, a Pixel Difference Determination (PDD) unit 112, a noise compensation unit 114, and a scoring unit 116. The image-processing device 100 may further comprise a demosaic unit 118, a False Color Suppression (FCS) unit 120, one or more input/output (I/O) devices, such as an I/O device 122, a data acquisition unit 124, and a secondary storage unit 126.

The processor 102 may comprise suitable logic, circuitry, interfaces, and/or code that may be configured to execute a set of instructions stored in the memory 104 and/or the secondary storage unit 126. The processor 102, in conjunction with the color adjustment unit 108, the color modification unit 110, the PDD unit 112, the noise compensation unit 114, and/or the scoring unit 116, may be operable to process one or more multi-channel images. The processing may correspond to suppression of color-aliasing in multi-channel image regions of the one or more multi-channel images. The processor 102 may be implemented based on a number of processor technologies known in the art. Examples of the processor 102 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 104 may comprise suitable logic, circuitry, and/or interfaces that may be configured to store a machine code and/or a computer program with at least one code section executable by the processor 102. Examples of implementation of the memory 104 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), and/or cache memory.

The transceiver 106 may comprise suitable logic, circuitry, interfaces, and/or code that may be configured to communicate with a user terminal (not shown), via a communication network (not shown). The transceiver 106 may implement known technologies to support wired or wireless communication of an external source (not shown) with the communication network. Various components of the transceiver 106 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 106 may communicate with networks, such as the Internet, an Intranet and/or a wireless network, such as a cellular telephone network, a wireless local area network (LAN), and/or a metropolitan area network (MAN), via wireless communication. The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g, and/or IEEE 802.11n), voice over Internet Protocol (VoIP), Wi-MAX, a protocol for email, instant messaging, and/or Short Message Service (SMS).

The color adjustment unit 108 may comprise suitable logic, circuitry, interfaces, and/or code that may be configured to adjust pixel values of one or more pixels in a multi-channel image region. The color adjustment unit 108 may be further configured to convert the multi-channel image into a mono-channel image. The color adjustment unit 108 may be implemented based on a number of processor technologies known in the art.

The color modification unit 110 may comprise suitable logic, circuitry, interfaces, and/or code that may be configured to modify the adjusted pixel values of one or more pixels in the multi-channel image region, which is in accordance with a pre-specified signal pattern, of the multi-channel image. The modification may be based on one or more parameters, such as a pixel offset value and a pixel step value, in accordance with a pre-specified signal pattern (such as a pyramid pattern). The color modification unit 110 may be implemented based on a number of processor technologies known in the art.

The PDD unit 112 may comprise suitable logic, circuitry, interfaces, and/or code that may be configured to determine a pixel difference value between the adjusted pixel values and the modified pixel values of the one or more pixels in the multi-channel image region. The PDD unit 112, in conjunction with the processor 102, may determine the pixel difference value, based on various mathematical functions. Examples of the mathematical functions that may include, but are not limited to, a sum of absolute difference (SAD) function, a sum of squared difference (SSD) function, a weighted sum of absolute difference (WSAD) function and/or a weighted sum of squared difference (WSSD) function. Notwithstanding, other mathematical functions known in the art may also be implemented, without deviation from the scope of the disclosure. The PDD unit 112 may be implemented based on a number of processor technologies known in the art.

The noise compensation unit 114 may comprise suitable logic, circuitry, interfaces, and/or code that may be configured to determine a threshold noise level of the adjusted pixel values of one or more pixels in the multi-channel image region. The noise compensation unit 114 may be further configured to perform noise compensation on the adjusted pixel values to compensate various types of noise signals associated with the adjusted pixel values. The noise compensation may be performed based on one or more noise compensation algorithms, such as a linear filtering algorithm, a median filtering algorithm, and/or an adaptive filtering algorithm. Examples of the various types of noise signals may include, but are not limited to, an additive white Gaussian noise, a Salt-and-pepper noise, a Shot noise, a Quantization noise (uniform noise), a Film grain noise, and/or an Anisotropic noise. The noise compensation unit 114 may be implemented based on a number of processor technologies known in the art.

The scoring unit 116 may comprise suitable logic, circuitry, interfaces, and/or code that may be configured to determine a score, based on a ratio of a pixel difference value and a maximum pixel step value. The maximum pixel step value may correspond to a maximum pixel value from the modified pixel values of the one or more pixels in the multi-channel image region. The scoring unit 116 may be implemented based on a number of processor technologies known in the art.

The demosaic unit 118 may comprise suitable logic, circuitry, interfaces, and/or code that may be configured to perform interpolation to recover a full set of color channels from a CFA sub-sampled multi-channel image. The demosaic unit 118 may perform such interpolation, based on various demosaic algorithms known in the art, such as a simple interpolation algorithm, a pixel correlation within the multi-channel image, and/or video super-resolution algorithm. The demosaic unit 118 may be implemented, based on a number of processor technologies known in the art.

The FCS unit 120 may comprise suitable logic, circuitry, interfaces, and/or code that may be configured to suppress color aliasing (or false color) present in the full set of color channels of the multi-channel image recovered by the demosaic unit 118. The FCS unit 120 may be further configured to perform operations, such as alpha blending, to digitally suppress false color present in the multi-channel image. The FCS unit 120 may be implemented based on a number of processor technologies known in the art.

The I/O device 122 may comprise suitable logic, circuitry, interfaces, and/or code that may be configured to receive an input from the user. The input from the user may correspond to an image capture of a scene. The I/O device 122 may be further configured to provide an output to the user. The I/O device 122 may comprise various input and output devices that may be configured to communicate with the processor 102. Examples of the input devices may include, but are not limited to, a touch screen, a keyboard, a mouse, a joystick, a microphone, a motion sensor, a light sensor, and/or a docking station. Examples of the output devices may include, but are not limited to, a display screen, a projector screen, and/or a speaker.

The data acquisition unit 124 may comprise suitable logic, circuitry, interfaces, and/or code that may be configured to capture the multi-channel image. The data acquisition unit 124 may comprise one or more imaging sensors to capture the multi-channel image. Examples of the one or more imaging sensors in the data acquisition unit 124 may include, but are not limited to, a semiconductor charged couple device (CCD), an active pixel sensors in complementary metal-oxide-semiconductor (CMOS), an N-type metal-oxide-semiconductor (NMOS), a Live MOS, and/or a flat panel detector.

The secondary storage unit 126 may comprise suitable logic, circuitry, interfaces, and/or code that may be configured to store the multi-channel image. The secondary storage unit 126 may receive the multi-channel image from the data acquisition unit 124, the remote data acquisition unit (not shown), or other such imaging devices. In accordance with an embodiment, the secondary storage unit 126 may be further configured to store a pixel step value and a pixel offset value, computed by the color modification unit 110, in conjunction with the processor 102. In accordance with an embodiment, the secondary storage unit 126 may be further configured to store a pixel difference value, computed by the PDD unit 112. In accordance with an embodiment, the secondary storage unit 126 may be further configured to store a threshold noise level, determined by the noise compensation unit 114. In accordance with an embodiment, the secondary storage unit 126 may be further configured to store a score, determined by the scoring unit 116. In accordance with an embodiment, the secondary storage unit 126 may comprise a non-volatile semiconductor memory in which one or more block areas that constitute the non-volatile semiconductor memory may be used to store the multi-channel image. Examples of the secondary storage unit 126 may include, but not limited to, a Hard disk drive (HDD), a storage server, a Secure Digital (SD) card, and a flash memory.

In operation, the processor 102 may generate a request for a multi-channel image and communicate the request to the transceiver 106. The request may be generated based on an input provided by a user, via the I/O device 122. The input from the user may correspond to an image capture of a scene, such as a soccer match. The transceiver 106 may transmit the request to an external source, such as a server (not shown), via a communication network. Based on the transmitted request, the transceiver 106 may receive the multi-channel image from the external source, via the communication network. In a particular instance, the external source may be associated with a television broadcasting station. In another instance, the external source may be implemented as a single server, a cluster of servers, or a cloud server. The implementation of the external source may be based on several technologies that are well known to those skilled in the art.

The communication network may include a medium through which the processor 102 may communicate with the external source, via the transceiver 106. Examples of the communication network may include, but are not limited to, the Internet, a Dedicated Short-Range Communication (DSRC) network, a Mobile Ad Hoc Network (MANET), an Internet-based Mobile Ad Hoc Network (IMANET), a Wireless Sensor Network (WSN), a Wireless Mesh Network (WMN), the Internet, a cellular network, a Long-Term Evolution (LTE) network, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the network environment (not shown) may be configured to connect to the communication network, in accordance with various wired and wireless communication protocols. Examples of such wired and wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term evolution (LTE), File Transfer Protocol (FTP), ZigBee, Enhanced Data rates for GSM Evolution (EDGE), infrared (IR), and/or Bluetooth (BT) communication protocols.

In accordance with an embodiment, the processor 102 may be configured to receive the multi-channel image directly from the image sensors of the data acquisition unit 124. In accordance with an embodiment, the processor 102 may be configured to receive the multi-channel image from a remote data acquisition unit (not shown), via the communication network. In such a case, the remote data acquisition unit may be communicatively connected to the image-processing device 100. The processor 102 may be further configured to store the multi-channel image in the secondary storage unit 126.

In accordance with an embodiment, the processor 102 may be configured to retrieve the multi-channel image from the secondary storage unit 126. The one or more channels of the multi-channel image may be utilized to specify the color of each pixel, in accordance with the color model of the multi-channel image. For example, an RGB image has three channels: one for Red, one for Green and one for Blue. In another example, a CMYK image has four channels: one for Cyan, one for Magenta, one for Yellow, and one for Black. Examples of the multi-channel image may include, but are not limited to, a digital color photograph, a digital color video, a Bayer sensor raw image, and/or a multi spectral image (that may comprise multiple channels/frequency components). The multi-channel image may contain data of a certain color space, such as RGB (Official Specification "IEC 61966-2-1:1999") or YUV (Official Specification "ITU-R BT.709-5").

The processor 102 may be configured to select one or more multi-channel image regions in the multi-channel image. In accordance with an embodiment, the one more multi-channel image regions may be selected manually, based on pixel coordinates provided by the user, via the I/O device 122. In accordance with an embodiment, the one more multi-channel image regions may be selected automatically, based on a pattern and/or an image recognition technique, known in the art.

The selected one or more multi-channel image regions may comprise one or more pixels of a pre-specified count. For example, a "5×5" multi-channel image region comprises "25 pixels". Each pixel from the one or more pixels in each region from the selected one or more multi-channel image regions may be associated with one or more channels. In accordance with an embodiment, a count of channels of a color model may be based on a count of the one or more color channel components in each pixel from one or more pixels in each region. For example, a count of color channels in each pixel of the RGB color model is three. The three color channels are Red (R) channel, Blue (B) channel, or Green (G) channel. Thus, each pixel in the RGB color model comprises three components, such as Red component, Blue component, and Green component, each represented by an 8-bit integer number with the value from 0 to 255. An integer number with different bits length (more or less bits than the 8-bit integer number), or a floating number may also be used to record a pixel value. The processor 102 may communicate each region from the selected one or more multi-channel image regions to the color adjustment unit 108 and the demosaic unit 118.

In accordance with an embodiment, the color adjustment unit 108 may be configured to convert the multi-channel image, such as the RGB color image, into a mono-channel image. The one or more pixels in the mono-channel image may be associated with limited pixel value information. In other words, the one or more pixels in the mono-channel image are not associated with color information, such as chrominance. The color adjustment unit 108 may be configured to adjust pixel values of one or more pixels in the multi-channel image region. The adjustment of the pixel value associated with each pixel of the one or more pixels in the multi-channel image region may be based on one or more factors, such as a difference between ambient viewing conditions and display viewing conditions of the multi-channel image by the user.

In accordance with an embodiment, the adjustment of the pixel values may correspond to a white balancing operation on the pixel values of the one or more pixels in the multi-channel image region. For example, the pixel values of the one or more pixels in the multi-channel image region in a three-channel component image may be adjusted, based on a mathematical operation expressed by equation (1), as follows:

$$\begin{bmatrix} R \\ G \\ B \end{bmatrix} = \begin{bmatrix} 255/R'_w & 0 & 0 \\ 0 & 255/G'_w & 0 \\ 0 & 0 & 255/B'_w \end{bmatrix} \begin{bmatrix} R' \\ G' \\ B' \end{bmatrix} \quad (1)$$

where "255" and "0" correspond to white color and black color, respectively;

"R", "G" and "B" represents white balanced Red, Green, and Blue color components, respectively, of each pixel of one or more pixels in the multi-channel image region in the three-channel component image;

"R'", "G'", and "B'" are the Red, Green, and Blue color components of the three-channel component image before white balancing; and "$R'_w$", "$G'_w$", and "$B'_w$" are the Red, Green, and Blue color components of a pixel, which may represent a white surface in the three-channel component image before white balancing.

In accordance with an embodiment, the color adjustment unit 108 may communicate each region from the selected one or more multi-channel image regions to the color modification unit 110, the PDD unit 112, and the noise compensation unit 114. In accordance with an embodiment, the color modification unit 110, in conjunction with the processor 102, may be configured to modify the pixel values of one or more pixels in the adjusted multi-channel image region. The modification may be based on one or more parameters, such as a pixel offset value and a pixel step value, in accordance with a pre-specified signal pattern (such as a pyramid pattern). In accordance with an embodiment, the pixel step value may be based on a center pixel value and an average of pixel values of a plurality of edge pixels at one or more edges of the adjusted multi-channel image region. The pixel step value may be computed by the color modification unit 110 in conjunction with the processor 102, based on a pixel step value function, as mathematically expressed as equation (3) in FIG. 2B.

In accordance with an embodiment, the pixel offset value may be based on an average of pixel values of a plurality of edge pixels at one or more edges of the adjusted multi-channel image region and the pixel step value. The pixel offset value may be computed by the color modification unit 110 in conjunction with the processor 102, based on a pixel offset value function, as mathematically expressed as equation (4) in FIG. 2B. In accordance with an embodiment, the color modification unit 110 may communicate the modified pixel values associated with one or more pixels of each region from the one or more adjusted multi-channel image regions to the PDD unit 112.

The PDD unit 112, in conjunction with the processor 102, may be configured to determine the pixel difference value between the adjusted pixel values and the modified pixel values of the one or more pixels of each multi-channel image region. As described above, the adjusted pixel values may be received from the color adjustment unit 108, and the modified pixel values may be received from the color modification unit 110. The pixel difference values may be computed in accordance with one of equations (5), (6), (7), or (8), as described in FIG. 2E. Notwithstanding, the disclosure may not be so limited and other functions known in the art may also be utilized to compute the pixel value difference, without deviation from the scope of the disclosure. The PDD unit 112 may be further configured to communicate the pixel difference value of each region to the scoring unit 116.

In accordance with an embodiment, the noise compensation unit 114, in conjunction with the processor 102, may be configured to determine a threshold noise level. The threshold noise level may correspond to the adjusted pixel values of the one or more pixels in the multi-channel image region from the selected one or more multi-channel image regions. The noise compensation unit 114 may be further configured to perform a noise compensation operation on the adjusted pixel values of the one or more pixels in the multi-channel image region to remove various types of noise signals. In accordance with an embodiment, the various types of noise signals may include, but are not limited to, a Gaussian noise, a Salt-and-pepper noise, a Shot noise, a Quantization noise (uniform noise), a Film grain and/or an Anisotropic noise. The noise compensation unit 114 may be configured to communicate the threshold noise level to the scoring unit 116.

In accordance with an embodiment, the scoring unit 116 may be configured to receive the pixel difference value of each region from the PDD unit 112 and the threshold noise level from the noise compensation unit 114. The scoring unit 116 may be further configured to determine a score based on a ratio of the pixel difference value and the maximum pixel step value (that corresponds to the modified pixel values of one or more pixels in the multi-channel image region). The determined score may correspond to an indication of an extent to which the adjusted pixel values are similar to the modified pixel values.

In accordance with an embodiment, the scoring unit 116, in conjunction with the processor 102, may be further configured to perform a comparison between the determined score and a pre-determined threshold. In a particular instance, the score may be less than the pre-determined threshold. The instance corresponds to an absence of the pre-specified signal pattern in the adjusted pixel values of the one or more pixels in the multi-channel image region. Further, in a particular instance, the score may exceed the pre-determined threshold. The instance corresponds to a presence of the pre-specified signal pattern in the adjusted pixel values of the one or more pixels in the multi-channel image region. The scoring unit 116 may communicate the determined score to the FCS unit 120.

In accordance with an embodiment, the demosaic unit 118, in conjunction with the processor 102, may be configured to receive the multi-channel image that includes one or more multi-channel image regions. The demosaic unit 118, in conjunction with the processor 102, may be configured to perform interpolation on the received multi-channel image to recover the full set of color channels from the multi-channel image. The interpolation may be performed pixel-by-pixel or block-by-block for every region of the selected one or more multi-channel image regions of the received multi-channel image. In accordance with an embodiment, the multi-channel image may be received from a color filter array (CFA), such as Bayer filter, subsampled sensor data. In accordance with an embodiment, the demosaic unit 118 may introduce a color aliasing in the full set of color channels of the one or more multi-channel image regions, referred to as the color-aliased regions. The color aliasing may comprise a spatial aliasing and/or a temporal aliasing technique known in the art. The spatial aliasing may correspond to a spatially-sampled color channel and the temporal aliasing corresponds to a time-sampled color channel. The demosaic unit 118 may communicate the recovered full set of color channels of each multi-channel image region from the selected one or more multi-channel image regions, to the FCS unit 120.

The FCS unit 120 may be configured to perform suppression of the false color present in the recovered full set of color channels, based on the comparison, the determined score, and the ratio of the pixel difference value and the maximum pixel step value. In accordance with an embodiment, the recovered full set of color channels with suppressed false color may correspond to a filtered set of color channels. The FCS unit 120 may utilize one or more image processing operations known in the art, such as alpha blending, for such suppression. In accordance with an embodiment, the alpha-blending operation may be expressed mathematically by equation (2), as follows:

$$OUT\_RB = (G-RB)*ratio + RB \quad (2)$$

where "G" represents pixel value of the Green color channel from the full set of color channels;

"RB" represents pixel value of Red color channel and/or Blue color channel from the full set of color channels;

"OUT_RB" represents pixel value of the Red color channel and/or the Blue color channel from the filtered set of color channels; and "ratio" represents a ratio that may be determined by the score generated from the scoring unit 116.

Figure 2A:
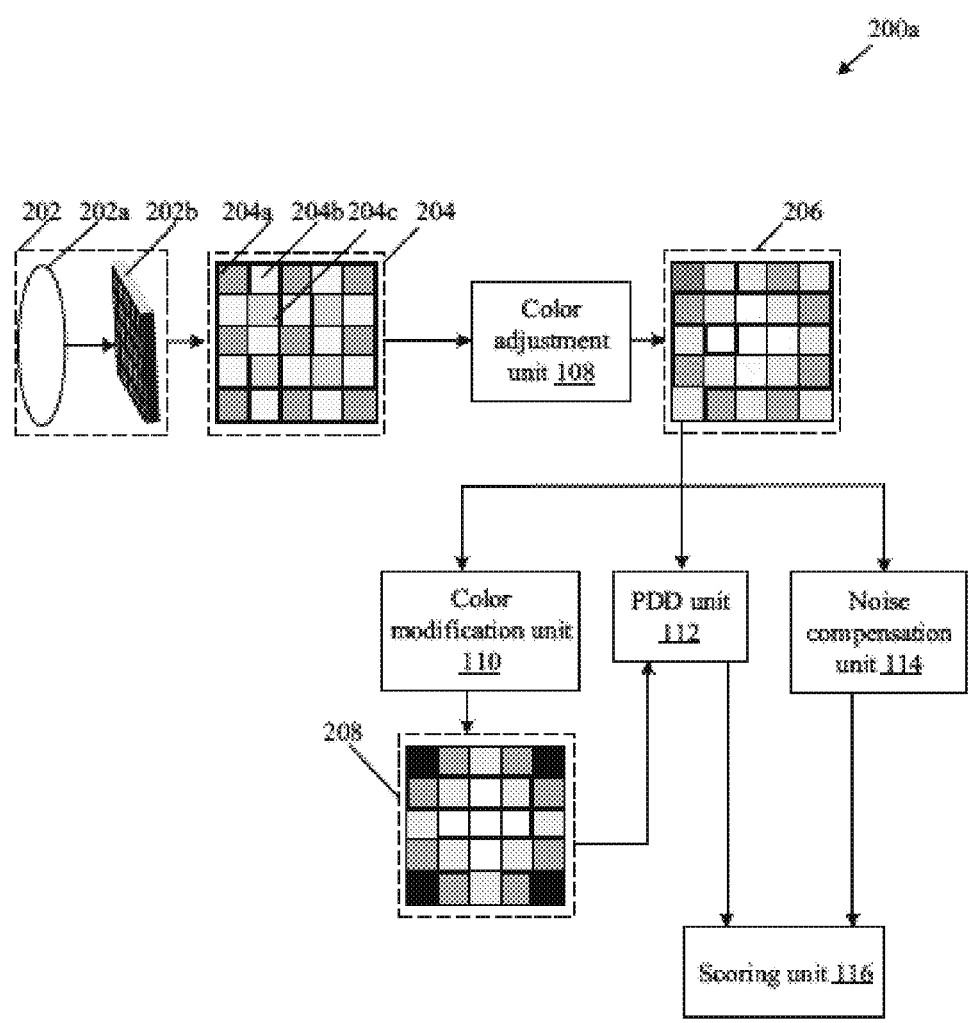
FIG. 2A illustrates a first arrangement of various components of an image-processing device, to determine a score that corresponds to an identification of a pre-specified signal pattern in adjusted pixel values of one or more pixels in a multi-channel image region, in accordance with an embodiment of the disclosure.

FIG. 2A illustrates a first arrangement of various components of an image-processing device to determine a score, in accordance with an embodiment of the disclosure. The score may correspond to an identification of a pre-specified signal pattern, such as the pyramid pattern, in adjusted pixel values of one or more pixels in a multi-channel image region. FIG. 2A is explained in conjunction with elements from FIG. 1. With reference to FIG. 2A, there is shown a first arrangement 200a of various components of the image-processing device 100, such as the color adjustment unit 108, the color modification unit 110, the PDD unit 112, the noise compensation unit 114, and the scoring unit 116, as described in FIG. 1. There is further shown a combination 202 of a lens 202a and a Bayer sensor 202b in the data acquisition unit 124. There is further shown a multi-channel image region 204 of a multi-channel image, an adjusted region 206, and a modified region 208.

In operation, the lens 202a may focus light (reflected from an object (not shown)), on the Bayer sensor 202b. The Bayer sensor 202b may capture at least one value per pixel location and each pixel value may correspond to red, green, or blue color channel information. Accordingly, the Bayer sensor 202b may generate a multi-channel image, based on the captured pixel values. The multi-channel image may comprise one or more multi-channel image regions, such as the multi-channel image region 204. As shown in FIG. 2A, the multi-channel image region 204 may comprise a pre-specified count of pixels, such as, "5×5 pixels". Further, one or more pixels in the multi-channel image region 204 may be associated with one or more color channels. For example, a first pixel 204a corresponds to Red color channel, a second pixel 204b corresponds to Green color channel, and a third pixel 204c corresponds to Blue color channel of the multi-channel image. The multi-channel image region 204 may be communicated to the color adjustment unit 108.

The color adjustment unit 108 may be configured to adjust the pixel values of one or more pixels of the multi-channel image region 204. The pixel values of the one or more pixels of the multi-channel image region 204 may be adjusted by the color adjustment unit 108 based on the white balancing of the pixel values of the one or more pixels, as explained in detail in FIG. 1. The color adjustment unit 108 may be configured to convert the multi-channel image region 204 to the adjusted region 206. The adjusted region 206 may be treated as a mono-channel image region. Thus, the adjusted pixel values of the one or more pixels in the adjusted region 206 are considered as grayscale values, although these adjusted pixel values may represent information from Red color channel, Green color channel, or Blue color channel. The adjusted region 206 may be communicated to the color modification unit 110, the PDD unit 112, and the noise compensation unit 114.

The color modification unit 110 may be configured to modify the pixel values of the one or more pixels in the adjusted region 206, based on a pixel offset value and a pixel step value, in accordance with the pre-specified signal pattern, such as the pyramid pattern, which is known in the art. The pixel step value and the pixel offset value is explained in detail in FIG. 2B. In accordance with an embodiment, the color modification unit 110 may generate a modified region 208 which comprises one or more pixels with modified pixel values, as explained in detail in FIG. 2C. In accordance with an embodiment, the modified region 208 may be communicated to the PDD unit 112.

The PDD unit 112 may be further configured to receive the adjusted region 206 from the color adjustment unit 108 and the modified region 208 from the color modification unit 110. The PDD unit 112 may determine a pixel difference value between adjusted pixel values of one or more pixels in the adjusted region 206 and modified pixel values of the one or more pixels in the modified region 208. The pixel difference may be determined, based on various types of pixel difference functions that may refer to various mathematical functions. The various types of pixel difference functions are explained in detail in FIG. 2E. The PDD unit 112 may communicate the determined pixel difference value to the scoring unit 116.

Further, the noise compensation unit 114 may determine a threshold noise level of the adjusted pixel values of one or more pixels in the adjusted region 206, received from the color adjustment unit 108. The noise compensation unit 114 may be further configured to compensate various types of noise signals associated with the adjusted pixel values of one or more pixels in the adjusted region 206. The noise signals may be compensated based on one or more noise removal algorithms, such as a linear filtering, a median filtering, an adaptive filtering, and/or the like. The noise compensation unit 114 may communicate the determined threshold noise level of the adjusted pixel values of one or more pixels in the adjusted region 206, to the scoring unit 116.

The scoring unit 116 may be configured to receive the determined pixel difference value from the PDD unit 112 and the determined threshold noise level from the noise compensation unit 114. The scoring unit 116 may be configured to receive maximum pixel step value determined by the color modification unit 110. The maximum pixel step value corresponds to the maximum pixel step value of the center pixel in the modified region 208. For instance, when the maximum pixel step value exceeds the received threshold noise level for the adjusted region 206, the scoring unit 116 may determine a score based on a ratio of the pixel difference value and the maximum pixel step value.

The scoring unit 116, in conjunction with the processor 102, may be further configured perform a comparison between the determined score and the received threshold noise level. In an instance, when the score is less than the received threshold noise level, there may be no pre-specified signal pattern, such as the pyramid pattern, in the adjusted pixel values of the one or more pixels in the multi-channel image region 204. In another instance, when the score exceeds the received threshold noise level, that may be a presence of the pre-specified signal pattern in the adjusted pixel values of the one or more pixels in the multi-channel image region 204.

Figure 2B:
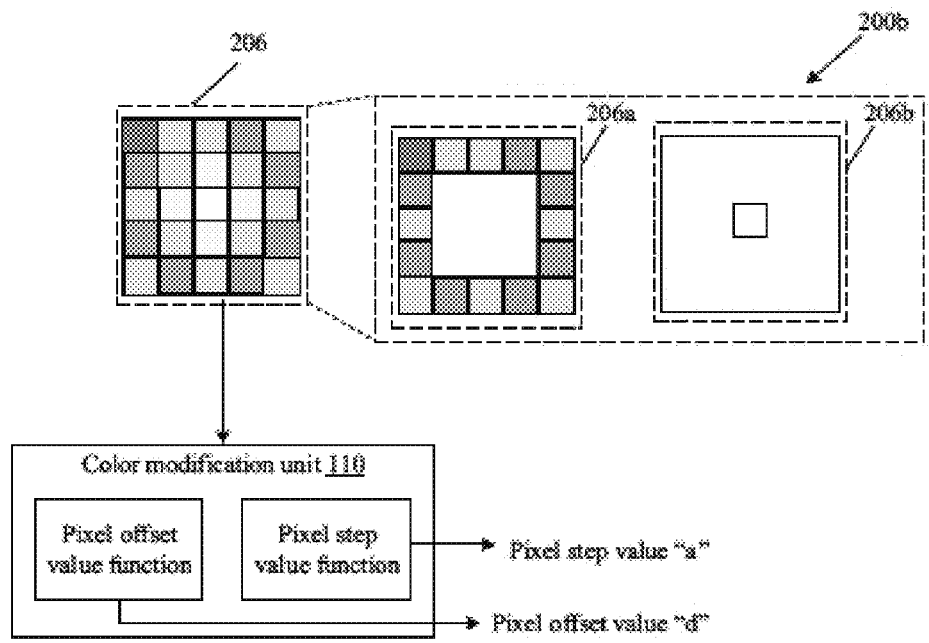
FIG. 2B illustrates a method for computation of a pixel step value and a pixel offset value for a multi-channel image region, in accordance with an embodiment of the disclosure.

FIG. 2B illustrates a method for computation of a pixel step value and a pixel offset value for a multi-channel image region, in accordance with an embodiment of the disclosure. FIG. 2B is explained in conjunction with elements from FIGS. 1 and 2A. With reference to FIG. 2B, there is shown an exemplary scenario 200b that illustrates the adjusted region 206. The adjusted region 206 comprises a plurality of edge pixels 206a and a center pixel 206b. The computed pixel step value may be represented by "a", and the pixel offset value may be represented by "d".

In accordance with the exemplary scenario 200b, the pixel step value may be computed by the color modification unit 110 in conjunction with the processor 102, based on a pixel step value function. The pixel step value function may be expressed mathematically by equation (3), as follows:

$$a = \frac{(C_p - AE_p)}{3} \qquad (3)$$

where "a" represents the pixel step value, "$AE_p$" represents an average pixel value of the plurality of edge pixels 206a, and "$C_p$" represents the pixel value of the center pixel 206b. In accordance with an embodiment, the pixel offset value may be computed based on a pixel offset value function. The pixel offset value function may be expressed mathematically by equation (4), as follows:

$$d = \frac{(AE_p - a)}{3} \qquad (4)$$

where "d" represents the pixel offset value, "$AE_p$" represents the average pixel value of the plurality of edge pixels 206a, and "a" represents the pixel step value of the adjusted region 206.

Figure 2C:
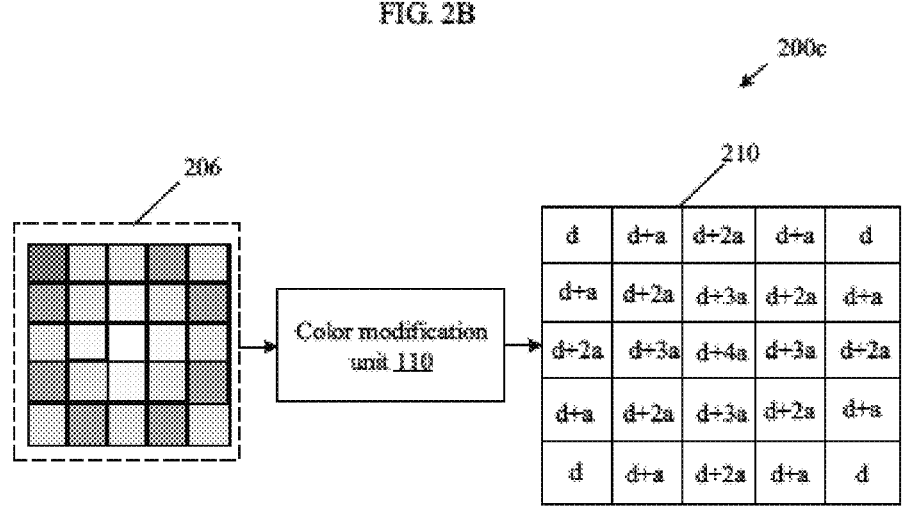
FIG. 2C illustrates an exemplary scenario that represents a correspondence between a modified region and a mathematical representation model of a three-dimensional (3D) pyramid, in accordance with an embodiment of the disclosure.

FIG. 2C illustrates an exemplary scenario that represents a correspondence between a modified region and a mathematical representation model of a 3D pyramid, in accordance with an embodiment of the disclosure. FIG. 2C is explained in conjunction with elements from FIGS. 1 and 2A. With reference to FIG. 2C, there is shown an exemplary scenario 200c that illustrates the adjusted region 206 and a mathematical representation model 210. The mathematical representation model 210 corresponds to the modified region

208 generated by the color modification unit 110. The mathematical representation model 210 may be generated by the color modification unit 110 in conjunction with the processor 102, based on the pixel step value and the pixel offset value, computed based on the equations (3) and (4), respectively.

In accordance with the exemplary scenario 200c, a first set of four corner pixels of the mathematical representation model 210 may be computed, based on the pixel offset value, "d". A second set of next horizontal and vertical adjacent pixels of the first set of pixels may be computed, based on the combination, "d+a", of the pixel offset value, "d", and the pixel step value, "a". Similarly, a third set of next horizontal and vertical adjacent pixels of the second set of pixels may be computed, based on the combination, "d+2a", of the pixel offset value, "d", and the next pixel step value, "2a". Similarly, a fourth set of next horizontal and vertical adjacent pixels of the third set of pixels may be computed, based on the combination, "d+3a", of the pixel offset value, "d", and the next pixel step value, "3a". Finally, the center pixel of the modified region 208 may be computed, based on the combination, "d+4a", of the pixel offset value, "d", and the maximum pixel step value, "4a".

Figure 2D:
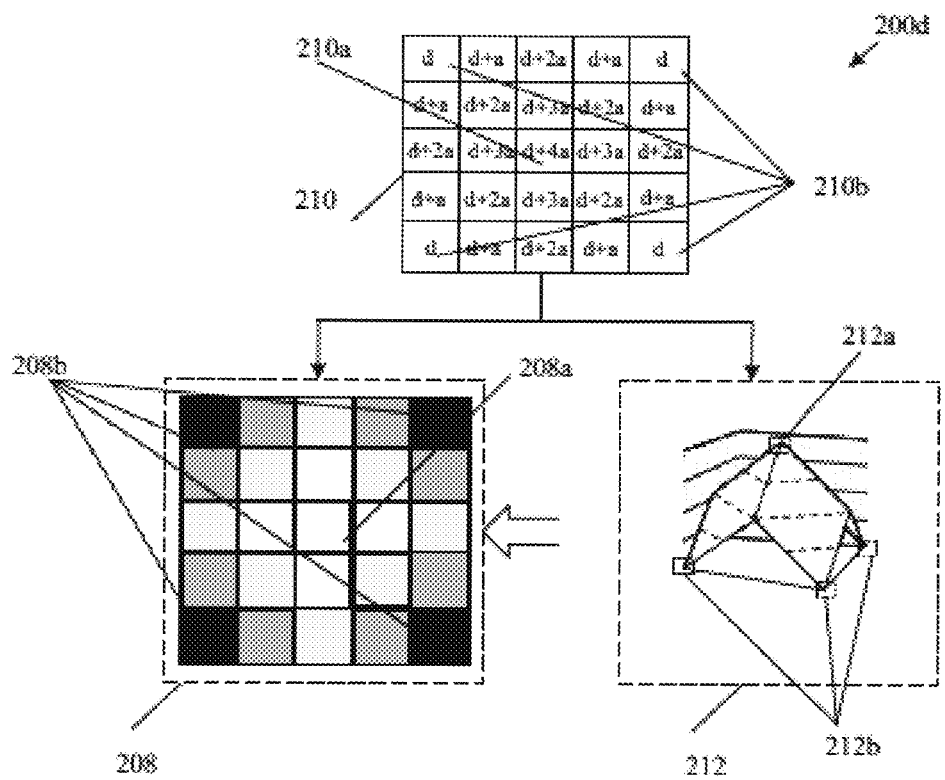
FIG. 2D illustrates an exemplary scenario that represents a 3D pyramid model for modified region, in accordance with an embodiment of the disclosure.

FIG. 2D illustrates an exemplary scenario that represents a 3D pyramid model for a modified region, in accordance with an embodiment of the disclosure. FIG. 2D is explained in conjunction with elements from FIGS. 1, 2A, 2B, and 2C. With reference to FIG. 2D, there is shown an exemplary scenario 200d that illustrates the modified region 208, the mathematical representation model 210, and a corresponding 3D pyramid model 212.

With reference to the exemplary scenario 200d, the color modification unit 110 may be configured to generate the modified region 208, as illustrated in the mathematical representation model 210. For example, the pixel value of the center pixel 208a in the modified region 208 corresponds to the combination, "d+4a", (depicted by 210a) in the mathematical representation model 210. Further, the pixel values of the four corner pixels 208b in the modified region 208 correspond to the pixel offset values, "d", (depicted by 210b) in the mathematical representation model 210. The pixel values of the one or more pixels in the modified region 208 may be graphically represented by the 3D pyramid model 212. For example, the modified region 208 comprises the center pixel 208a and the corner pixels 208b. The pixel value associated with the center pixel 208a corresponds to the peak 212a of the 3D pyramid model 212. Further, pixel values associated with the corner pixels 208b correspond to a minimum pixel value 212b of the 3D pyramid model 212. Similarly, other pixel values associated with other pixels correspond to the other values of the 3D pyramid model 212.

Figure 2E:
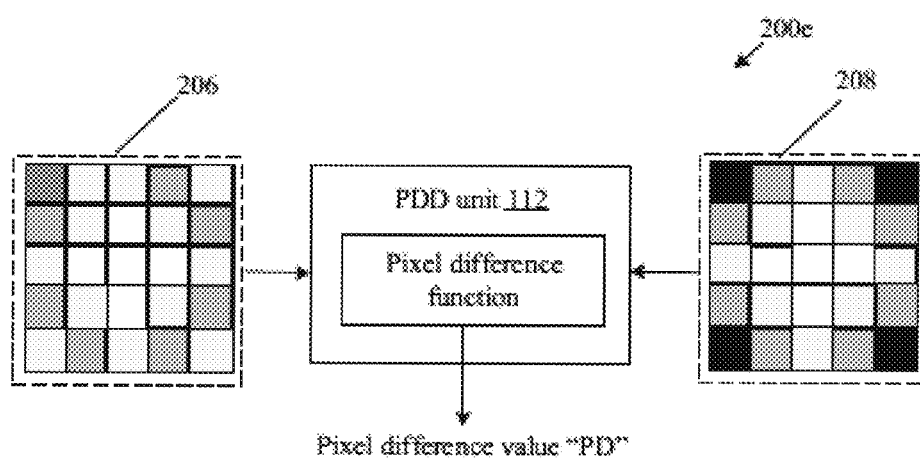
FIG. 2E illustrates an exemplary scenario that represents determination of a pixel difference value between adjusted pixel values and modified pixel values of one or more pixels of a multi-channel image region, in accordance with an embodiment of the disclosure.

FIG. 2E illustrates an exemplary scenario that represents determination of pixel difference values between adjusted pixel values and modified pixel values of one or more pixels of a multi-channel image region, in accordance with an embodiment of the disclosure. FIG. 2E is explained in conjunction with elements from FIGS. 1 and 2A. With reference to FIG. 2E, there is shown an exemplary scenario 200e that illustrates the one or more pixels in the adjusted region 206. Such one or more pixels in the adjusted region 206 may be associated with adjusted pixel values. The exemplary scenario 200d further illustrates the one or more pixels in the modified region 208. Such one or more pixels in the adjusted region 206 may be associated with modified pixel values. The determination of the pixel difference value may be based on various types of pixel difference functions, as explained below.

The PDD unit 112, in conjunction with the processor 102, may be configured to determine a pixel difference value between the adjusted pixel values and the modified pixel values of the one or more pixels that correspond to the multi-channel image region 204. The pixel difference value may be computed in accordance with either of equations (5), (6), (7) or (8), or other such pixel difference function, known in the art.

In accordance with an embodiment, the pixel difference value may be computed mathematically by equation (5), as follows:

$$PD_{SAD}(p,q)=\Sigma_{m,n}|p(m,n)-q(m,n)| \quad (5)$$

where "$PD_{SAD}(p,q)$" may represent the pixel difference value based on a sum of absolute difference (SAD) function between the adjusted pixel values "p" and the modified pixel values "q". Further, "m" may represent a row value and "n" may represent a column value of the multi-channel image region 204.

In accordance with an embodiment, the pixel difference value may be computed mathematically by equation (6), as follows:

$$PD_{SSD}(p,q)=\Sigma_{m,n}|p(m,n)-q(m,n)|^2 \quad (6)$$

where "$PD_{SSD}(p,q)$" may represent the pixel difference value based on sum of squared difference (SSD) function between the adjusted pixel values "p" and the modified pixel values "q". Further, "m" may represent a row value and "n" may represent a column value of the multi-channel image region 204.

In accordance with an embodiment, the pixel difference value may be computed mathematically by equation (7), as follows:

$$PD_{WSAD}(p,q)=\Sigma_{m,n}c(m,n)|p(m,n)-q(m,n)| \quad (7)$$

where "$PD_{WSAD}(p,q)$" may represent the pixel difference value based on weighted sum of absolute difference (WSAD) function between the adjusted pixel values "p" and the modified pixel values "q". Further, "c" may represent a weighting factor for each pixel component, "m" may represent a row value, and "n" may represent a column value of the multi-channel image region 204.

In accordance with an embodiment, the pixel difference value may be computed mathematically by equation (8), as follows:

$$PD_{WSSD}(p,q)=\Sigma_{m,n}c(m,n)\Sigma_{m,n}|p(m,n)-q(m,n)|^2 \quad (8)$$

where "$PD_{WSSD}(p,q)$" may represent the pixel difference value based on weighted sum of squared difference (WSSD) function between the adjusted pixel values "p" and the modified pixel values "q". Further, "c" may represent a weighting factor for each pixel component, "m" may represent a row value, and "n" may represent a column value of the multi-channel image region 204.

Figure 3:
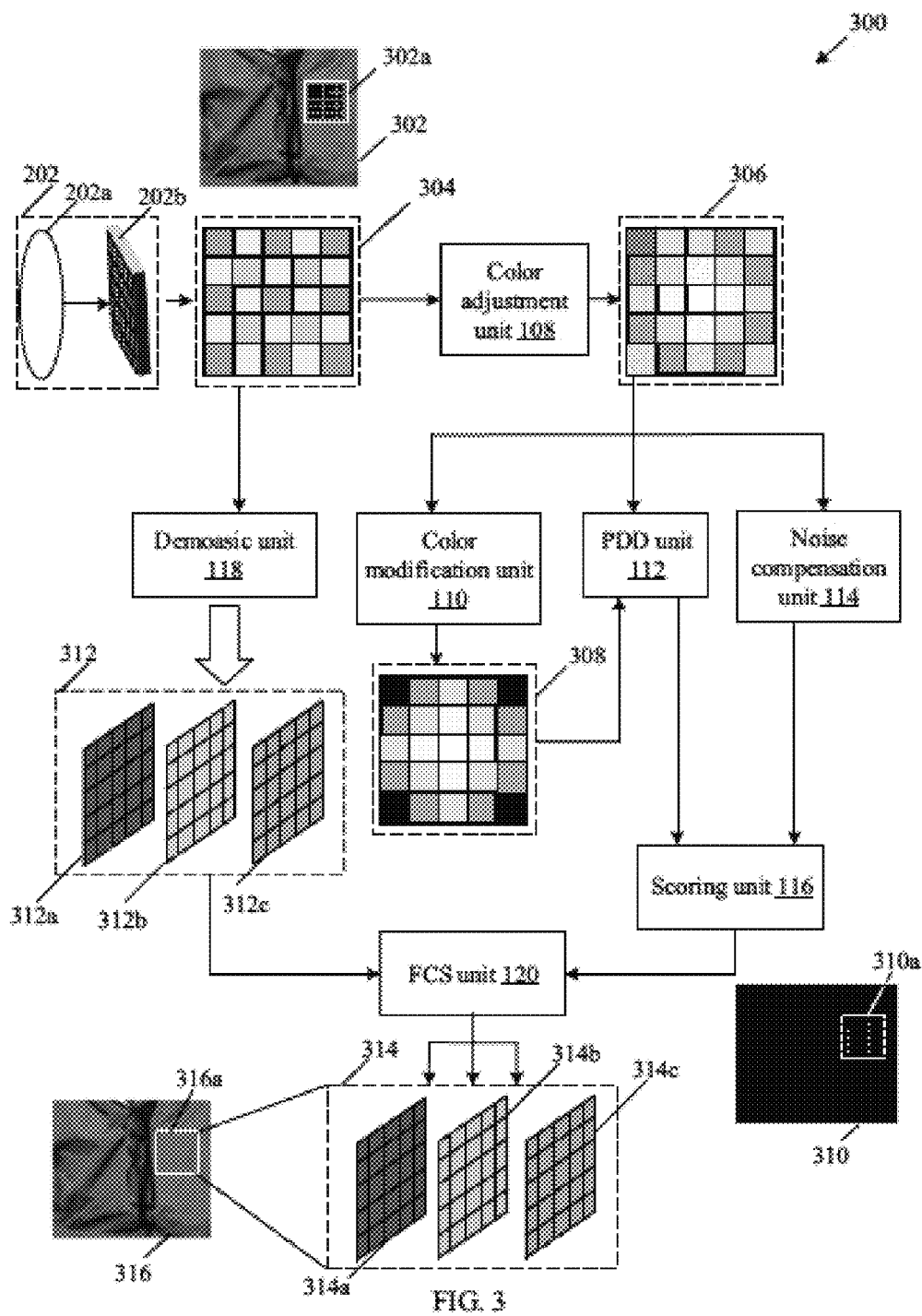
FIG. 3 illustrates a second arrangement of various components of an image-processing device, to depict a method and system for suppression of color-aliased region of a demosaiced multi-channel image region of a multi-channel video frame, in accordance with an embodiment of the disclosure.

FIG. 3 illustrates a second arrangement of various components of an image-processing device, to depict a method and system for suppression of color-aliased region of a demosaiced multi-channel image region of a multi-channel video frame, in accordance with an embodiment of the disclosure. FIG. 3 is explained in conjunction with elements from FIGS. 1 and 2A to 2E. With reference to FIG. 3, there is shown a second arrangement 300 that depicts a method and system for suppression of aliased colors in a multi-channel region 302a of a multi-channel video frame 302. There is further shown an adjusted region 306 and a modified region 308, similar to the adjusted region 206 and a modified region 208, respectively, shown in FIG. 2A. There is further shown an intermediate video frame 310, which corresponds to the multi-channel video frame 302. The intermediate video frame 310 may include a multi-channel image region 310a, in which a pre-specified signal pattern, such as the pyramid pattern, is detected.

There is further shown a full set of color channels 312 that may comprise one or more color channels, such as a first color channel 312a, a second color channel 312b, and a third color channel 312c, recovered by the demosaic unit 118 from the multi-channel region 302a. There is further shown a reconstructed set of color channels 314, which may comprise a first reconstructed color channel 314a, a second reconstructed color channel 314b, and a third reconstructed color channel 314c. There is further shown a digitally reconstructed multi-channel video frame 316, which includes a false-color suppressed frame region 316a.

In operation, the combination 202 may focus light reflected from an object (not shown) via the lens 202a on the Bayer sensor 202b. The Bayer sensor 202b may capture at least one value per pixel location and each pixel value may correspond to red, green, or blue color channel information. Accordingly, the Bayer sensor 202b may generate a multi-channel video frame 302, based on the captured pixel values. The multi-channel video frame 302 may comprise one or more multi-channel image regions, such as the multi-channel region 302a. As shown in FIG. 3, the multi-channel region 302a may comprise a pre-specified count of pixels, such as, "5×5 pixels", which may be represented by the multi-channel region 304, similar to the multi-channel image region 204 as described in FIG. 2A. Further, one or more pixels in the multi-channel region 302a may be associated with one or more color channels, such as Red color channel, Green color channel, and Blue color channel. The multi-channel region 304 that represents the multi-channel region 302a may be communicated to the color adjustment unit 108.

The color adjustment unit 108 may be configured to adjust the pixel values of one or more pixels of the multi-channel region 302a. The pixel values of the one or more pixels of the multi-channel region 302a may be adjusted by the color adjustment unit 108 based on the white balancing of the pixel values of the one or more pixels, as explained in detail in FIG. 1. The color adjustment unit 108 may be configured to convert the multi-channel region 302a to the adjusted region 306. The adjusted region 306 may be treated as a mono-channel image region. Thus, the adjusted pixel values of the one or more pixels in the adjusted region 306 are considered as grayscale values, although these adjusted pixel values may represent information from Red color channel, Green color channel, or Blue color channel. The adjusted region 306 may be communicated to the color modification unit 110, the PDD unit 112, and the noise compensation unit 114.

The color modification unit 110 may be configured to modify the pixel values of the one or more pixels in the adjusted region 306, based on a pixel offset value and a pixel step value, in accordance with the pre-specified signal pattern, such as the pyramid pattern, which is known in the art. The computation of the pixel step value and the pixel offset value is explained in detail in FIG. 2B. In accordance with an embodiment, the color modification unit 110 may generate a modified region 308 which comprises one or more pixels with modified pixel values, as explained in detail in FIG. 2C. In accordance with an embodiment, the modified region 308 may be communicated to the PDD unit 112.

The PDD unit 112 may be further configured to receive the adjusted region 306 from the color adjustment unit 108 and the modified region 308 from the color modification unit 110. The PDD unit 112 may determine a pixel difference value between adjusted pixel values of one or more pixels in the adjusted region 306 and modified pixel values of the one or more pixels in the modified region 308. The pixel difference may be determined, based on various types of pixel difference functions that may refer to various mathematical functions. The various types of pixel difference functions are explained in detail in FIG. 2E. The PDD unit 112 may communicate the determined pixel difference value to the scoring unit 116.

Further, the noise compensation unit 114 may determine a threshold noise level of the adjusted pixel values of one or more pixels in the adjusted region 306, received from the color adjustment unit 108. The noise compensation unit 114 may be further configured to compensate various types of noise signals associated with the adjusted pixel values of one or more pixels in the adjusted region 306. The noise compensation unit 114 may communicate the determined threshold noise level of the adjusted pixel values of one or more pixels in the adjusted region 306, to the scoring unit 116.

The scoring unit 116 may be configured to receive the determined pixel difference value from the PDD unit 112 and the determined threshold noise level from the noise compensation unit 114. The scoring unit 116 may be configured to receive maximum pixel step value, such as "4a" (FIG. 2C), determined by the color modification unit 110. The maximum pixel step value corresponds to the center pixel in the modified region 308. For instance, when the maximum pixel step value exceeds the received threshold noise level for the adjusted region 306, the scoring unit 116 may determine a score based on a ratio of the pixel difference value and the maximum pixel step value.

The scoring unit 116, in conjunction with the processor 102, may determine a score for the multi-channel region 302a. This method may be based on a score that is determined (based on a ratio of the pixel difference value and the maximum pixel step value), as described in the first arrangement 200a of various components of the image-processing device 100. The pixel difference value may be received from the PDD unit 112. The scoring unit 116, in conjunction with the processor 102, may be further configured perform a comparison between the determined score and the threshold noise level received from the noise compensation unit 114. For instance, when the score is less than the received threshold noise level, there may be no pre-specified signal pattern, such as the pyramid pattern, in the adjusted pixel values of the one or more pixels in the multi-channel region 302a. In another instance, when the score exceeds the received threshold noise level, that may be a presence of the pre-specified signal pattern in the adjusted pixel values of the one or more pixels in the multi-channel region 302a.

In accordance with an embodiment, the pixel values of the one or more pixels in the detected multi-channel image region 310a may correspond to the 3D pyramid model 212, as explained in FIG. 2D. Thus, the presence of the 3D pyramid model may be detected and depicted in the multi-channel image region 310a, which is in the intermediate video frame 310. The intermediate video frame 310 that includes the detected multi-channel image region 310a may be communicated to the FCS unit 120. The FCS unit 120 may further receive the full set of color channels 312 of the multi-channel region 302a from the demosaic unit 118. The full set of color channels 312 may be recovered by the demosaic unit 118, based on one or more demosaic techniques known in the art. The full set of color channels 312 may comprise the first color channel 312a (such as the Red color channel), the second color channel 312b (such as the Green color channel), and the third color channel 312c (such as the Blue color channel).

The FCS unit 120 may perform an alpha blending operation to suppress false color present in the full set of color channels 312 (received from the demosaic unit 118), based on the determined score (received from the scoring unit 116). The alpha blending operation may be performed in accordance with the equation (2), as described in FIG. 1. Accordingly, the FCS unit 120 may generate the reconstructed set of color channels 314. The reconstructed set of color channels 314 may comprise the first reconstructed color channel 314a (such as the reconstructed Red color channel), the second reconstructed color channel 314b (such as the reconstructed Green color channel), and the third reconstructed color channel 314c (such as the reconstructed Blue color channel). Thus, the FCS unit 120 may further generate the false-color suppressed frame region 316a, based on the reconstructed set of color channels 314. Accordingly, the digitally reconstructed multi-channel video frame 316 may be generated, which may include the false-color suppressed frame region 316a.

Figure 4:
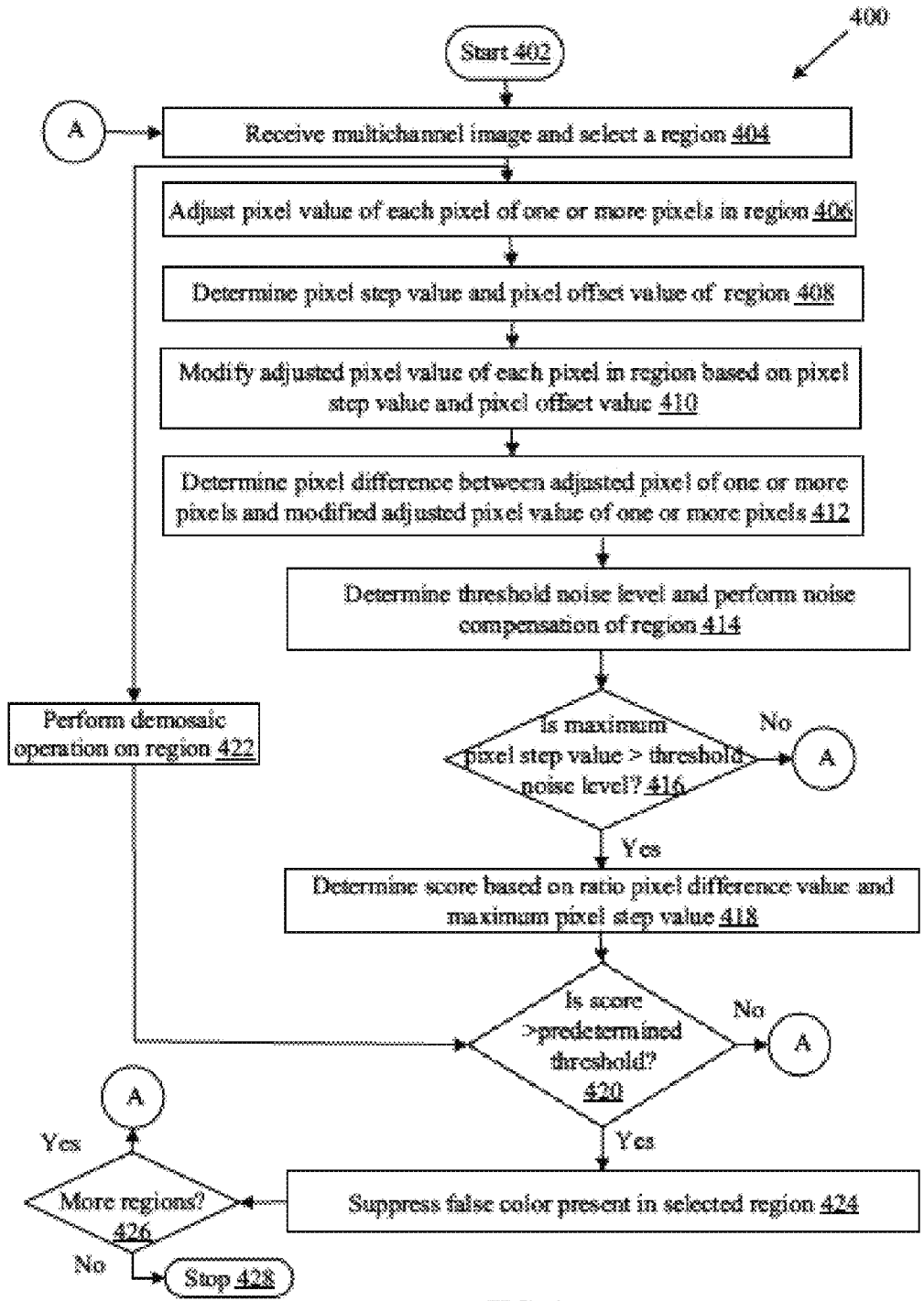
FIG. 4 illustrates a flow chart for implementation of an exemplary method for processing a multi-channel image, in accordance with an embodiment of the disclosure.

FIG. 4 illustrates a flow chart for implementation of an exemplary method for processing a multi-channel image, in accordance with an embodiment of the disclosure. FIG. 4 is described in conjunction with elements of FIGS. 1, 2A to 2E, and 3. The method, in accordance with a flowchart 400 in FIG. 4, may be implemented in the image-processing device 100, as described in FIG. 1. With reference to FIG. 4, the method, in accordance with the flowchart 400, begins at step 402 and proceeds to step 404.

At step 404, a multi-channel image, such as the multi-channel video frame 302 (FIG. 3), captured by the data acquisition unit 124, may be received by the processor 102. The processor 102, in conjunction with the data acquisition unit 124, may select a multi-channel image region, such as the multi-channel region 302a, from one or more multi-channel image regions in the multi-channel video frame 302.

At step 406, pixel values of the one or more pixels of the multi-channel region 302a may be adjusted by the color adjustment unit 108. Accordingly, the color adjustment unit 108 may determine the adjusted region 306. The adjusted pixel values of the one or more pixels in the adjusted region 306 may comprise only pixel value information. The adjusted pixel values of one or more pixels in the adjusted region 306 may not comprise color information, such as chrominance.

At step 408, a pixel step value and a pixel offset value of the one or more pixels in the selected the multi-channel image region 304 may be computed by the color modification unit 110 in conjunction with the processor 102. At step 410, the adjusted pixel values of the one or more pixels in the multi-channel image region 304 may be modified, based on the computed pixel step value and the pixel offset value, in accordance with a pre-specified signal pattern. The modification may be performed by the color modification unit 110, to generate the modified region 308.

At step 412, a pixel difference value may be computed by the PDD unit 112. The pixel difference value may be computed between the adjusted pixel values of the one or more pixels in the adjusted region 306, and the modified pixel values of the one or more pixels in the modified region 308. The pixel difference value may be computed, based on various pixel difference functions that may include, but not limited to, the SAD function, the SSD function, the WSAD function, and/or the WSSD, as described in FIG. 2E. At step 414, a threshold noise level may be determined by the noise compensation unit 114. In accordance with an embodiment, compensation of noise may be performed on adjusted pixel values of one or more pixels in the adjusted region 306.

At step 416, a comparison may be performed between a maximum pixel step value and the threshold noise level by the scoring unit 116. In accordance with an embodiment, the maximum pixel step value may correspond to the center pixel in the modified region 308. For instance, when the maximum pixel step value is less than the threshold noise level, the control passes to step 404. For instance, when the maximum pixel step value exceeds the threshold noise level, the control passes to step 418.

At step 418, the score may be determined by the scoring unit 116, based on the ratio of the pixel difference value and the maximum pixel step value. At step 420, a comparison between the determined score and a pre-determined threshold may be performed by the scoring unit 116. In an instance, when the score is less than the pre-determined threshold, the control passes to step 404. Such an instance may correspond to an absence of a 3D pyramid model in the adjusted pixel values of one or more pixels in the adjusted region 306. In another instance, when the score exceeds the pre-determined threshold, the control passes to step 424. Such an instance may correspond to a presence of the 3D pyramid model in the adjusted pixel values of one or more pixels in the adjusted region 306.

At step 422, a full set of color channels may be recovered by the demosaic unit 118, from the multi-channel image region 304. At step 424, suppression of color difference may be performed for the full set of color channels by the FCS unit 120 based on the ratio of the pixel difference value and the maximum pixel step value. The FCS unit 120 may generate a set of reconstructed color channels, such as the reconstructed set of color channels 314. The FCS unit 120 may further generate a false-color suppressed region, such as the false-color suppressed frame region 316a, based on the reconstructed set of color channels 314. Accordingly, the digitally reconstructed multi-channel video frame 316 may be generated, which may include the false-color suppressed frame region 316a. At step 426, it may be determined whether there are more multi-channel image regions in the multi-channel video frame 302. In an instance, when there are more multi-channel image regions, the control passes back to step 406. In an instance, when there is no other multi-channel image region in the multi-channel video frame 302, the control passes to end step 428.

In accordance with an embodiment of the disclosure, a system for image processing may comprise the image-processing device 100 (as shown in FIG. 1). The image-processing device 100 may comprise one or more processors, such as the processor 102, the color adjustment unit 108, the color modification unit 110, the PDD unit 112, the noise compensation unit 114, the scoring unit 116, the demosaic unit 118, and the FCS unit 120, as shown in FIG. 1. The color modification unit 110 may be configured to modify adjusted pixel values of one or more pixels in the region, such as the multi-channel region 302a, of a multi-channel image, such as the multi-channel video frame 302, in accordance with a pre-specified signal pattern, based on one or more parameters. The scoring unit 116 may be configured to determine the score based on the ratio of the pixel difference value and the maximum pixel step value. The maximum pixel step value may correspond to the center pixel when the maximum pixel step value exceeds a threshold noise level for the region. The FCS unit 120 may be configured to suppress the false color present in the multi-channel region 302*a* and generate the false-color suppressed frame region 316*a*.

Various embodiments of the disclosure may provide a non-transitory computer readable medium and/or storage medium, and/or a non-transitory machine readable medium and/or storage medium with a machine code and or a computer program stored thereon, and with at least one code section executable by a machine and/or a computer for image processing. The at least one code section in an image-processing device may cause the machine and/or computer to perform the steps, which may comprise modification of adjusted pixel values of one or more pixels in a multi-channel image region, in accordance with a pre-specified signal pattern based on one or more parameters. Thereafter, based on a ratio of a pixel difference value and a maximum pixel step value that corresponds to modified pixel values of one or more pixels in the multi-channel image region, a score may be determined.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image-processing method, comprising:
   in an image-processing device:
   modifying, based on a first signal pattern, adjusted pixel values of at least one pixel in a region of a multi-channel image to generate modified pixel values;
   computing a pixel difference value based on a difference between said adjusted pixel values and said modified pixel values of said at least one pixel in said region;
   determining, a score based on:
   a ratio of said pixel difference value and a maximum pixel step value that corresponds to said modified pixel values; and
   said maximum pixel step value that exceeds a threshold noise level for said region; and
   suppressing, false color in said region of said multi-channel image, based on said score.

2. The image-processing method of claim 1,
   wherein said maximum pixel step value corresponds to a center pixel of said region, and
   wherein said maximum pixel step value is a maximum of said modified pixel values.

3. The image-processing method of claim 2, wherein said at least one pixel comprises said center pixel and a plurality of edge pixels.

4. The image-processing method of claim 3, wherein said plurality of edge pixels are at edges of said region.

5. The image-processing method of claim 1, further comprising adjusting first pixel values of said at least one pixel, based on white balancing of said first pixel values of said at least one pixel.

6. The image-processing method of claim 1, further comprising:
   modifying, said adjusted pixel values of said at least one pixel, based on at least one parameter,
   wherein said at least one parameter comprises a first pixel step value and a pixel offset value.

7. The image-processing method of claim 6, further comprising computing, said first pixel step value, based on a center pixel value and an average of second pixel values of a plurality of edge pixels at edges of said region.

8. The image-processing method of claim 6, further comprising:
   computing, said pixel offset value based on an average of second pixel values of a plurality of edge pixels at edges of said region and said first pixel step value,
   wherein said pixel offset value corresponds to a minimum pixel value from said modified pixel values of said at least one pixel in said region.

9. The image-processing method of claim 1, further comprising computing, said pixel difference value based on at least one of a sum of absolute difference (SAD) function, a sum of squared difference (SSD), a weighted sum of absolute difference (WSAD), or a weighted sum of squared difference (WSSD) function.

10. The image-processing method of claim 1, further comprising compensating noise in said region based on said maximum pixel step value that is less than said threshold noise level for said region.

11. The image-processing method of claim 1, further comprising identifying said region as a multi-channel image region with an arrangement of pixel values in a second signal pattern similar to said first signal pattern, based on said score.

12. The image-processing method of claim 1, wherein full set of color channels of said multi-channel image corresponds to a demosaiced multi-channel image.

13. A multi-channel image processing system, comprising:
   memory configured to store instructions; and
   one or more processors configured to execute the instructions stored in the memory, wherein the one or more processors are further configured to:
   modify, based on a first signal pattern, adjusted pixel values of at least one pixel in a region of a multi-channel image to generate modified pixel values;

compute a pixel difference value based on a difference between said adjusted pixel values and said modified pixel values of said at least one pixel in said region;

determine a score based on:
- a ratio of said pixel difference value and a maximum pixel step value that corresponds to said modified pixel values; and
- said maximum pixel step value that exceeds a threshold noise level for said region; and suppress, false color in said region of said multi-channel image, based on said score.

14. The multi-channel image processing system of claim 13,
wherein said maximum pixel step value corresponds to a center pixel of said region, and
wherein said maximum pixel step value is a maximum of said modified pixel values.

15. The multi-channel image processing system of claim 14, wherein said at least one pixel comprises said center pixel and a plurality of edge pixels.

16. The multi-channel image processing system of claim 15, wherein said plurality of edge pixels are at edges of said region.

17. The multi-channel image processing system of claim 13, wherein said one or more processors are further configured to adjust first pixel values of said at least one pixel, based on white balancing of said first pixel values of said at least one pixel.

18. The multi-channel image processing system of claim 13,
wherein said one or more processors are further configured to modify, said adjusted pixel values of at least one pixel, based on at least one parameter,
wherein said at least one parameter comprises a first pixel step value and a pixel offset value.

19. The multi-channel image processing system of claim 18, wherein said one or more processors are further configured to compute said first pixel step value, based on a center pixel value and an average of second pixel values of a plurality of edge pixels at edges of said region.

20. The multi-channel image processing system of claim 18, wherein said one or more processors are further configured to:

compute said pixel offset value based on an average of second pixel values of a plurality of edge pixels at edges of said region and said first pixel step value,
wherein said pixel offset value corresponds to a minimum pixel value from said modified pixel values of said at least one pixel in said region.

21. The multi-channel image processing system of claim 13, wherein said one or more processors are further configured to compute said pixel difference value based on at least one of a sum of absolute difference (SAD) function, a sum of squared difference (SSD), a weighted sum of absolute difference (WSAD), or a weighted sum of squared difference (WSSD) function.

22. The multi-channel image processing system of claim 13, wherein said one or more processors are further configured to compensate noise in said region based on said maximum pixel step value that is less than said threshold noise level for said region.

23. The multi-channel image processing system of claim 13, wherein said one or more processors are further configured to identify said region as a multi-channel image region with an arrangement of pixel values in a second signal pattern similar to said first signal pattern, based on said score.

24. A non-transitory computer readable storage medium having stored thereon, a set of computer-executable instructions for causing a computer to execute operations, the operations comprising:

modifying, based on a signal pattern, adjusted pixel values of at least one pixel in a region of a multi-channel image to generate modified pixel values;

computing a pixel difference value based on a difference between said adjusted pixel values and said modified pixel values of said at least one pixel in said region;

determining, a score based on:
- a ratio of said pixel difference value and a maximum pixel step value that corresponds to said modified pixel values; and
- said maximum pixel step value that exceeds a threshold noise level for said region; and suppressing, false color in said region of said multi-channel image, based on said score.

* * * * *